Figure 1:
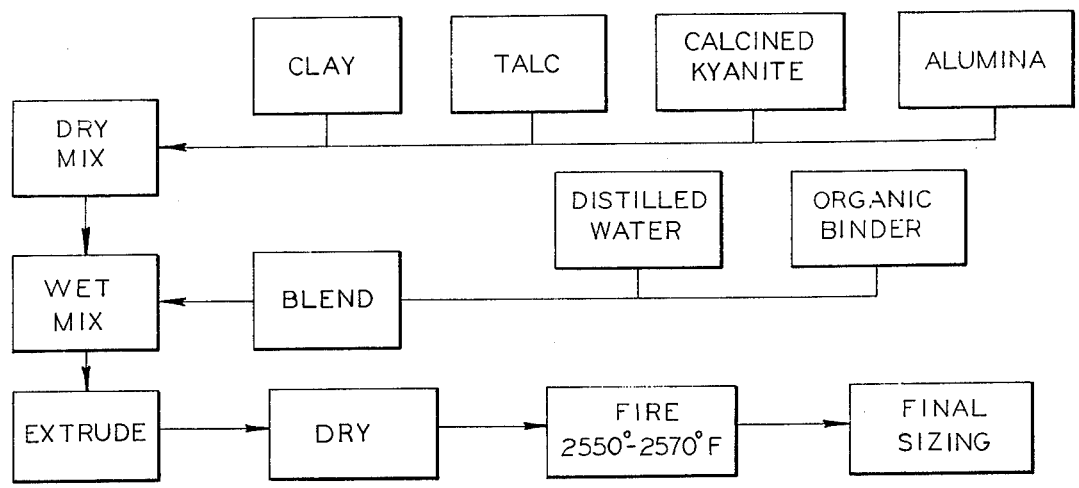

United States Patent [19]

Somers et al.

[11] 3,954,672

[45] May 4, 1976

[54] CORDIERITE REFRACTORY COMPOSITIONS AND METHOD OF FORMING SAME

[75] Inventors: Arthur V. Somers, Flushing; Morris Berg, Grand Blanc; Archie A. Shukle, Davison, all of Mich.

[73] Assignee: General Motors Corporation, Detroit, Mich.

[22] Filed: Nov. 4, 1974

[21] Appl. No.: 520,549

[52] U.S. Cl. .............................. 252/455 R; 106/62
[51] Int. Cl.² .................... B01J 29/06; C04B 35/04
[58] Field of Search .................... 252/455 R; 106/62

[56] References Cited
UNITED STATES PATENTS

| | | | |
|---|---|---|---|
| 2,731,355 | 1/1956 | Skinner | 106/62 |
| 2,864,919 | 12/1958 | Stringfellow | 106/62 X |
| 3,824,196 | 7/1974 | Benbow et al. | 252/455 R |
| 3,885,977 | 5/1975 | Lachman et al. | 106/62 |

*Primary Examiner*—Carl F. Dees
*Attorney, Agent, or Firm*—Sidney Carter

[57] ABSTRACT

Cordierite refractory compositions made from a mixture of talc, clay, calcined kyanite, alumina and water, the composition being such as to result on firing in a body having cordierite as the major crystalline phase and mullite as the minor crystalline phase and wherein the amount of $Na_2O$ and $K_2O$ is not in excess of about 0.14% by weight of the batch dry materials, such compositions being suitable for making a catalyst substrate or support in the form of an extruded multi-tubular refractory body as well as other ceramic bodies such as turbine engine components, heat exchanger cores and furnace ware which have a requirement for high resistance to heat shock and low thermal expansion characteristics.

10 Claims, 2 Drawing Figures

CORDIERITE REFRACTORY COMPOSITIONS AND METHOD OF FORMING SAME

This invention relates to cordierite compositions and the method for making a refractory body suitable for use, for example, as a support or substrate for catalyst materials useful in the chemical conversion of one or more constituents in a fluid stream, the composition being such that a body having high resistance to heat shock and low thermal expansion characteristics is achieved with economy and facility.

Refractory monolith catalyst support bodies formed of a ceramic material mixture and having a multiplicity of parallel fluid passages extending axially therethrough are well known in the art. Recently issued U.S. Pat. No. 3,824,196 to Benbow et al., dated July 16, 1974 and titled "Catalyst Support" is typical of such bodies. The patentee discloses a method for extruding a body using a refractory metal oxide mixture containing substantial amounts of a viscosity controlling polymer, this adding substantially to the cost. Further, the patent discloses the use of a talc, clay, and alumina mixture which on being fired at temperatures of from 1,000°–1,500° C. (1832°–2748° F.) produces a cordierite body. However, as is well known in the ceramic art, talc and clay are available as natural minerals having varying constituents and varying in the amount thereof.

Much effort has been recently expended on the development of materials and systems for the catalytic clean-up of exhaust emissions from automobiles. The rigorous operating conditions, i.e., severe mechanical shock and vibration as well as heat shock due to extremes of temperature when operating from cold start to high speeds over long periods of time, have necessitated the development of compositions which are suited to the mass production of ceramic monoliths capable of withstanding such extreme conditions.

The work of such early researchers as F. Singer and W. M. Cohn in 1929, produced a ceramic body in the three component system of alumina-magnesia-silica having an unusually low thermal expansion coefficient of $0.53 \times 10^{-6}$ between 0° and 200° C. and having high resistance to heat shock. As shown in the article "Development of Cordierite in Ceramic Bodies", H. H. Hausner, Ceramic Industry, pp. 80–84, May 1946, this body was formed from 43% talc (Goepfersgruener)
35% plastic clay (Zingendorfer)
22% $Al_2O_3$ As disclosed by Hausner, subsequent researchers attempted to reproduce the results obtained by Singer & Cohn and instead discovered the sensitivity to firing conditions and chemical composition. Typical of such efforts are the work done by R. S. Lamar and M. F. Warner, "Reaction and Fired-Property Studies of Cordierite Compositions", Journal of the American Ceramic Society, Vol. 37, No. 12, pp, 602–610, December 1954 and that of R. J. Beals and R. L. Cook, "Low-Expansion Cordierite Porcelains", Journal of the American Ceramic Society, Vol. 35, No. 2, pp. 53–57, February 1952.

We have found that both the physical characteristics of the resulting ceramic monolith, including resistance to thermal shock, extrudability without tearing, and the firing and melting temperatures, vary with the chemical composition. We have therefore found it necessary to select the chemical composition and the process for monolith manufacture in order to assure an efficient and economic process and an effective product.

Figure 2:
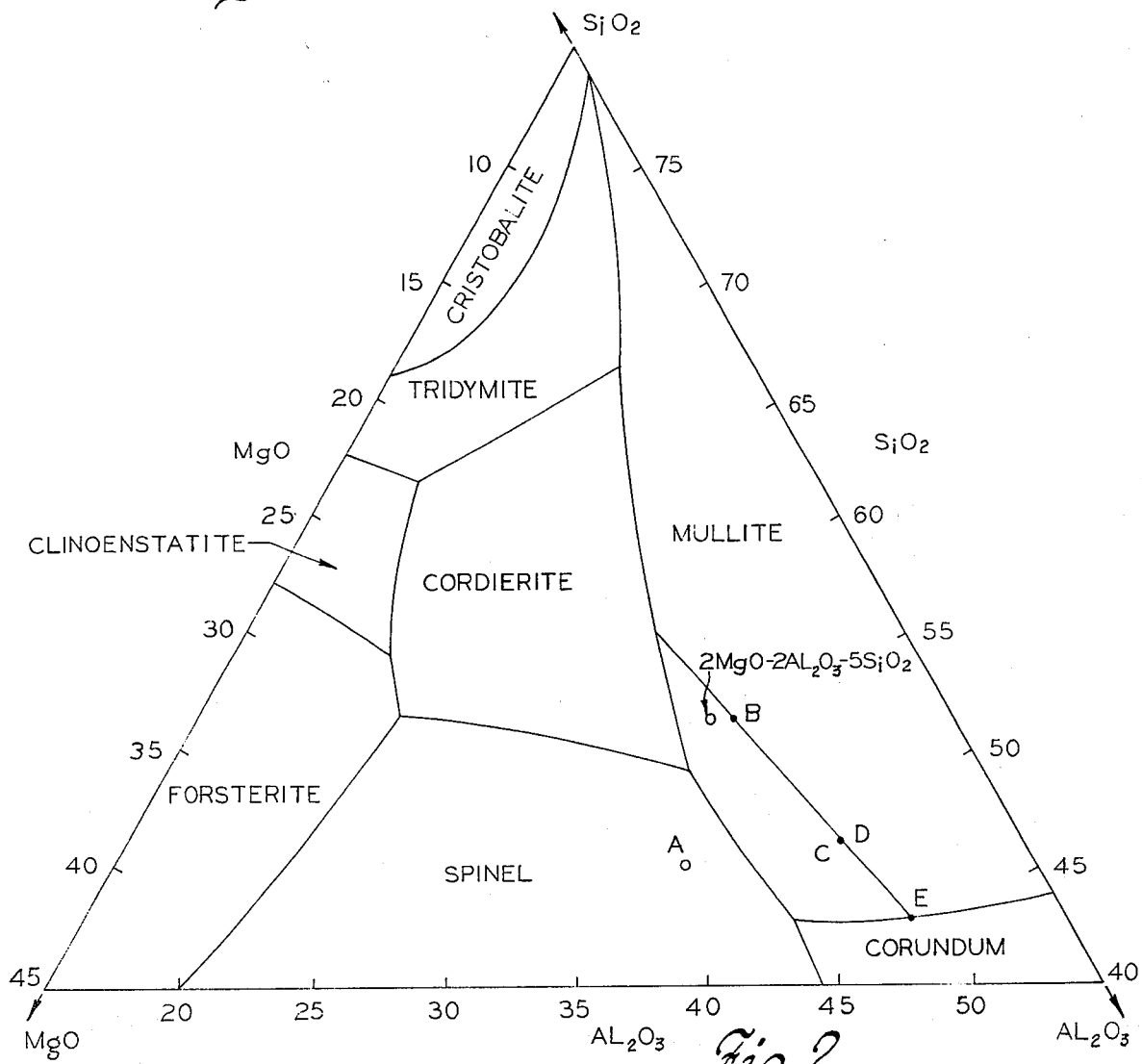

The character and limits of our invention are set forth in the specification and claims which follow, all as illustrated on the drawing in which FIG. 1 shows in block form the flow diagram of our preferred process for manufacturing the substrate monolith bodies of our invention, and FIG. 2 shows the compositions of our invention on a tri-axial diagram of the chemical system $Al_2O_3$—$MgO$—$SiO_2$.

As a result of extensive development efforts, we have been able to isolate a range of compositions which achieve the desired physical and thermal characteristics for use as ceramic substrate in the clean-up of auto emissions. We have also determined the need for limiting the amount of the alkali metals, sodium and potassium, present in the compositions. More particularly, we have found that the presence of sodium and potassium oxide in an amount of as-much-as 0.2% by weight of the dry batch materials results in a body having unacceptable heat shock resistance. The limitation of $Na_2O$ and $K_2O$ to a maximum of about 0.14% by weight results in good heat shock characteristics. It should be recognized that any of the other active alkali, i.e., lithium, could also have undesirable effects on our compositions, but, since this metal is rarely found in other than trace quantities in the natural materials used in accordance with out invention, this is of no real significance.

Thermal shock as used herein is measured by the number of thermal cycles a test body an be subjected to without cracking or spalling. In conducting our tests, the test body is formed from the fired extrudate and is one inch square and three inches long. The test cycle comprises placing the sample in an atmosphere of 1800° F. (982° C.) followed by removal to room temperature, the body being kept at each temperature long enough to reach the ambient level. As can be seen from TABLE I below, the number of thermal shock cycles required for acceptable operating results, as represented by samples B through E, is at least 20. The level of 1 to 5 cycles for sample A is unacceptable.

TABLE I

| Properties | Units | MONOLITH PROPERTIES A | B | C & D | E |
|---|---|---|---|---|---|
| Openings per inch (square grid) | — | 217 | 178 | 178 | 178 |
| Opening size - inside | inches | .053 | .057 | .057 | .057 |
| Cell wall thickness | inches | .014 | .018 | .018 | .018 |
| Bulk density | Lbs./Ft.$^3$ | 45 | 43 | 47 | 50 |
| Frontal opening | Percent | 62 | 58 | 58 | 58 |
| Geometric surface area | Ft.$^2$/Ft.$^3$ | 555 | 486 | 486 | 486 |
|  | Ft.$^2$/Lb. | 12.3 | 11.3 | 10.3 | 9.73 |
| Water absorption | Percent | 14 | 17 | 17 | 16 |
| Compression strength (parallel to cell walls) | P.S.I. | 6,600 | 4,826 | 5,987 | 6,791 |
| Thermal expansion coeffici- |  |  |  |  |  |

TABLE I-continued

| Properties | Units | MONOLITH PROPERTIES | | | |
|---|---|---|---|---|---|
| | | A | B | C & D | E |
| ent (20 to 950° C.) | Per° C. | $1.57 \times 10^{-6}$ | $0.94 \times 10^{-6}$ | $1.40 \times 10^{-6}$ | $1.90 \times 10^{-6}$ |
| Thermal shock (68 to 1800° F. to 68° F.) | Cycles | 1 to 5 | >20 | >20 | 20 |
| Melting point | Deg. F | 2,500 | 2,570 | 2,590 | No melting >2,730 |

As can be seen from the batch compositions and from the chemical analyses, TABLES II and III, samples C and D are of substantially the same chemical analysis though arrived at by different amounts of the raw materials. Reference to the melting point determined for each of the samples shows that the melting point increases as the amount of $Al_2O_3$ increases in the composition, the bodies being more refractory as the alumina content increases. While we have found that the thermal expansion coefficient increases as the alumina in the body increases through bodies B to E with the thermal expansion coefficient for body E higher at $1.90 \times 10^{-6}/°C$. than that for body A, body E is nonetheless fully acceptable since the thermal shock resistance is acceptable for body E whereas it is unacceptable for body A. This is due in part to the higher level of alumina with the result that the body E will tolerate a higher expansion before failing. Note that body A contains a greater amount of alkali metal.

As indicated above, we have found it to be important to control the chemical composition of the batch materials so as to limit the amount of $Na_2O$ and $K_2O$ to an amount not in excess of about 0.14% by weight of the dry batch constituents. By so limiting the amount of $Na_2O$ and $K_2O$ we find that when using the chemical formulations of our invention, refractory ceramic bodies are produced which have the desired heat shock resistant characteristics.

As shown in TABLE II, the compositions producing acceptable ceramic bodies capable of functioning to resist thermal heat shock and with minimum dimensional changes at temperatures as high as about 2000° F. are those for bodies identified as B through E, body A having unacceptable heat shock resistance as shown in TABLE I.

In order to control the composition of the bodies, we have found it necessary to use either de-ionized or distilled water to avoid the addition of undesired salts such as sodium and potassium. The addition of a binder such as Carbo-Wax (polyethylene glycol, 20,000 molecular weight), obtainable from sources such as Union Carbide Corporation, is added to produce a lubricating effect on the die used to form the desired body, i.e., the extrusion die used to form the catalyst monolith support or substrate, as well as to add a cohesive characteristic which enables the ready knitting together of the extruded stream of material through the die channels. The weight of water and binder used is shown as a percent of the dry batch materials used. Calcined kyanite or mullite is the fired form of natural kyanite and available from sources such as the Kyanite Mining Corporation, Dillwyn, Va. The talc having a minimum of sodium oxide and potassium oxide and a chemical analysis otherwise suited to our purposes was found to be that available from United Sierra Division of Cyprus Mines Corporation by the name Steawhite 200 and from Pfizer, Inc. by the name Talcron MP 98–25. The chemical analysis shows Steawhite talc to have a sodium oxide and potassium oxide content of from 0 to about 0.01% and 0 to about 0.06% by weight, respectively. The Jackson clay similarly has a very low sodium and potassium content of about 0.1 and 0.3%, respectively, and is obtainable from the Kentucky-Tennessee Clay Co., Inc. Both the Sierralite talc and the Old Mine No. 4 — Kentucky clay show a sodium oxide content of 0.3%, and potassium oxide contents of 0.2 and 1%, respectively, and have been found to be unacceptable source materials.

TABLE III shows the chemical composition of the batch materials mixtures shown in TABLE II. It should be understood that the chemical composition of each body A through E is that based on the batch materials and are readily calculated from the data listed. Also shown in TABLE III are the theoretical composition for cordierite, $2 MgO \cdot 2 Al_2O_3 \cdot 5 SiO_2$, and the adjusted figures based on only $MgO$, $Al_2O_3$ and $SiO_2$ for the sample bodies A through E. The sizing of the talc, clay, and alumina used in our composition is very fine and is such that at least about 99.4% passes through a 200 mesh screen and at least about 95% is finer than a 325 mesh screen. The kyanite is such that about 10% remains on a 200 mesh screen, about 19% on a 325 mesh and at least about 70% passes through the 325 mesh screen.

TABLE II

| Body | Talc | Clay | BATCH COMPOSITIONS Calcined kyanite | $Al_2O_3$ | Water | Binder |
|---|---|---|---|---|---|---|
| A | Sierralite 47.5% | Old Mine No. 4 Kentucky 38.0% | 14.5% | 0 | De-ionized 23.5% | 1% |
| B | Steawhite 39.0% | Jackson 29.7% | 19.5% | 11.8% | Distilled 20.5% | 1% |
| C | Steawhite 35.1% | Jackson 26.7% | 17.6% | 20.6% | Distilled 19.5% | 1% |
| D | Steawhite 35.0% | Jackson 29.7% | 13.1% | 22.2% | Distilled 20.6% | 1% |
| E | Steawhite 32.6% | Jackson 24.7% | 16.2% | 26.5% | Distilled 20.6% | 1% |

TABLE III

| | CHEMICAL COMPOSITION | | | | | Theoretical Cordierite | | | | | |
|---|---|---|---|---|---|---|---|---|---|---|---|
| | A | B | C | D | E | | A | B | C | D | E |
| Al$_2$O$_3$ | 31.2 | 32.6 | 39.4 | 39.2 | 43.8 | 34.9 | 36.3 | 35.2 | 42.2 | 42.2 | 46.7 |
| SiO$_2$ | 39.8 | 47.4 | 42.6 | 42.5 | 39.5 | 51.4 | 46.3 | 51.2 | 45.7 | 45.7 | 42.1 |
| MgO | 14.9 | 12.6 | 11.3 | 11.3 | 10.5 | 13.7 | 17.4 | 13.6 | 12.1 | 12.1 | 11.2 |
| L.O.I. (H$_2$O & Lignite) | 10.8 | 5.6 | 4.9 | 5.3 | 4.5 | | | | | | |
| TiO$_2$ | 0.7 | 0.8 | 0.7 | 0.7 | 0.6 | | | | | | |
| Fe$_2$O$_3$ | 1.4 | 0.6 | 0.5 | 0.5 | 0.5 | | | | | | |
| Na$_2$O & K$_2$O | 0.74 | 0.14 | 0.12 | 0.14 | 0.11 | | | | | | |

The compositions of our invention are clearly shown in FIG. 2 of the drawing which covers the cordierite portion of the phase diagram for the system consisting of magnesia-alumina-silica. It can be readily seen that the unacceptable body A lies in the spinel phase of the tri-axial diagram whereas the acceptable bodies lie in the mullite portion. The compositions of bodies B through E fall substantially on a straight line which defines the acceptable compositions of our invention, such compositions being further limited by the requirement that the Na$_2$O and K$_2$O content be not in excess of about 0.14% by weight.

It is of significance to note the several test methods used to determine the physical characteristics since test results will vary with the method used. (1) The ability of a monolith catalyst support or substrate to resist softening and slumping when exposed to continuous operating temperatures over relatively long periods is important. This softening point is desirably a minimum of 2400° F. (1316° C.) and is determined by placing a full size monolith into a furnace which is at room temperature. The body is then heated at the appropriate rate as set forth in ASTM Test Method C210-68 (Sept. 9, 1968) and is retained at maximum temperature for a period of 24 hours. The furnace and body are then permitted to cool back to room temperature. The body being examined for softening or slump. (2) Water absorption is determined in accordance with ASTM Test Method C-373-56 (Sept. 10, 1956, reapproved 1970). (3) The ability of a material to withstand mechanical stress is of obvious importance where it is to be used in an environment such as a vehicle emissions converter. One inch cube samples of the material are cut and are loaded in compression in a Riehle testing machine in a direction parallel to the fluid passages, the maximum load in pounds/square inch being calculated in the usual manner. (4) The linear thermal expansion coefficient is determined using a standard quartz tube and combination rod formed of quartz and the sample sections, the tube being secured to the case of a measuring gage, the rod being in contact with the sensing pin of the gage. The differential expansion of the tube and rod are measured at given temperature intervals as the test set up is heated in a furnace at a uniform rate of about 2° C./minute from room temperature to 950° C. Based on the known expansion characteristics of the quartz and the length of the ceramic sample, the thermal expansion coefficient for the sample can be arrived at in the manner well known in the art. Other methods such as that using a Theta Dilatronic II-R dilatometer and a linear variable differential transducer for comparing the ceramic test sample with a platinum standard may also be used. (5) Geometric surface area of the samples is determined by a nitrogen gas adsorption method using a Micromeritics Model 2200 Automatic Surface Area Analyzer.

In carrying out the method of our invention, the ceramic raw batch materials are processed in accordance with the sequence shown in FIG. 1. In our preferred embodiment we use the composition identified in TABLES II and III as that for body C and D. After weighing out the clay, talc, calcined kyanite and alumina, each previously screened for desired sizing, the materials are passed through four primary steps, (1) mixing, (2) extrusion, (3) drying, and (4) firing, the fired bodies being then dressed to required lengths.

More particularly, the measured and screened powder materials are dry mixed for a period of at least about 10 minutes. We have found that a Patterson-Kelly twin shell blender accomplishes the desired mixing in an effective manner. Other devices such as a Simpson mix-muller may also be used. The dry mixed materials are then wet mixed with a solution of the binder material, e.g., polyethylene glycol 20,000, in distilled or de-ionized water. In order to assure that the binder is thoroughly dissolved in the water, we have found it advisable to accomplish this blending in two steps. The required amount of binder is first added to about one-fourth of the water and is thoroughly mixed for achieving complete solution, about 10 minutes, this mixture being then stirred into the remaining water. The resultant solution is then added to the dry mixed powders over a period of about 4 minutes during which the materials are continually mixed in the Patterson-Kelly blender, mixing being continued thereafter for an additional short period, e.g., about 5 minutes.

Extrusion of the desired body is accomplished using a die of the type well known in the art. The aforementioned patent to Benbow U.S. Pat. No. 3,824,196 discloses the use of a die having the forming or front portion configured to produce parallel fluid passages of a triangular, rectangular, square, hexagonal or other desired shape. The feed or rear portion of the die is provided with a plurality of passages connecting with the front portion at intersect points of the channels into which the ceramic mixture is fed to form the desired passages in the extruded body. Similar dies are disclosed in U.S. Pat. No. 3,038,201 to Harkenrider, U.S. Pat. No. 1,601,536 to Laskey, and U.S. Pat. No. 1,874,503 to Greenwood.

While extrusion may be accomplished by means of piston, auger or pug mill feed, we prefer to use an auger extruder with simultaneous application of a vacuum, about 27 inches Hg, on the feed chamber to remove any air entrapped in the chamber and materials. The extruded body is cut to lengths slightly longer than that desired to enable final dressing to length after firing. Prior to firing, however, we have found it necessary to dry the green extruded body in order to avoid physical rupturing of the body and cell walls. This may be accomplished by slow drying in ambient air over a period of about 40–50 hours. We prefer to accomplish this drying on a more rapid time cycle and have found that this may be accomplished by use of a dielectric oven for rapidly but uniformly heating the extruded monolith with deep heating penetration. It should be noted that the green bodies are handled on foam rubber pads on which they are positioned vertically in order to distribute the load over a wider area than with side surface handling to prevent physical distortion.

The firing of the green, dried monoliths is accomplished by firing in an air atmosphere to a temperature of at least about 2550° F. and not exceeding about 2570° F. We prefer to fire at a peak temperature of from about 2552° to 2570° F. (1400°–1410° C.) in order to enable the formation of the maximum amount of cordierite phase. The firing to peak temperature is accomplished over a period of at least about 6 hours with peak temperature being maintained for a period of 3 to 4 hours. The bodies are moved through the furnace on a continuous moving line, the firing temperature zones and cooling zones being subject to well known control methods. Total firing time through the furnace can be as much as 24 hours depending on the furnace used, it being important to maintain uniform temperature in the peak firing zone because of the sensitivity of our compositions in forming cordierite.

Due to the fact that the green bodies are cut from the extruded "log" in a wet state, a smearing or collapse of the cell or passage walls of the monolith occurs under the pressure of the cutting tool. The fired parts are therefore dressed to final length by cutting off both end portions. A high speed saw is used, though a grinding cutting wheel may also be used. Any dust is of course carefully blown off the finished monolith.

While we have described our compositions in connection with the fabricatiion of an extruded monolith, it should be understood that such cordierite compositions may be used in many other forms where high resistance to thermal shock and low thermal expansion coefficients are desired in ceramic refractory components. Typical examples are turbine engine components, ceramic heat exchanger cores and furnace ware of various types. The scope of our invention is covered by the foregoing description and the claims which follow.

What is claimed is:

1. A ceramic refractory fired composition having high thermal shock resistance and a low thermal coefficient of expansion consisting essentially of magnesia, alumina, and silica in crystalline form with cordierite as the major phase and mullite as the minor phase and having an amount of $Na_2O$ and $K_2O$ which is not in excess of about 0.14% by weight of the composition.

2. A fired ceramic body having high resistance to thermal shock and a low thermal coefficient of expansion, the composition of which is substantially on the straight line defined by the compositions on the triaxial diagram of the magnesia-alumina-silica system consisting essentially of about the following percent by weight of the indicated constituents:

point B — 35.2% $Al_2O_3$, 51.2% $SiO_2$, 13.6% MgO
point C and D — 42.2% $Al_2O_3$, 45.7% $SiO_2$, 12.1% MgO
point E — 46.7% $Al_2O_3$, 42.1% $SiO_2$, 11.2% MgO, the major crystalline phase being cordierite and the minor crystalline phase being mullite, and the amount of $Na_2O$ and $K_2O$ contained in the body being less than about 0.14% by weight.

3. A fired ceramic body having high resistance to thermal shock and a low thermal coefficient of expansion consisting essentially of, by weight, about 35.2% $Al_2O_3$, about 51.2% $SiO_2$, and about 13.6% MgO, the major crystalline phase being cordierite and the minor crystalline phase being mullite, and the amount of $Na_2O$ and $K_2O$ contained in the body being less than about 0.14% by weight.

4. A fired ceramic body as in claim 3 wherein the amounts of the ingredients are about 42.2% $Al_2O_3$, about 45.7% $SiO_2$, and about 12.1% MgO.

5. A fired ceramic body as in claim 3 wherein the amounts of the ingredients are about 46.7% $Al_2O_3$, about 42.1% $SiO_2$, and about 11.2% MgO.

6. A fired ceramic body as in claim 2 wherein said compositions are formulated from ceramic batch materials consisting of clay, talc, alumina and calcined kyanite.

7. A method of making a refractory ceramic catalyst support having a plurality of parallel fluid passages extending therethrough which comprises forming a mixture, in % by weight, of from about 32.6 to 39.0% talc, from about 24.7 to 29.7% clay, from about 13.1 to 19.5% calcined kyanite, and from about 11.8 to 26.5% alumina, the mixture being such that after firing the composition is substantially on the straight line defined by compositions on the triaxial diagram of the magnesia-alumina-silica system consisting essentially of about the following percent by weight of the indicated constituents:

point B — 35.2% $Al_2O_3$, 51.2% $SiO_2$, 13.6% MgO
point C and D — 42.2% $Al_2O_3$, 45.7% $SiO_2$, 12.1% MgO
point E — 46.7% $Al_2O_3$, 42.1% $SiO_2$, 11.2% MgO, the major crystalline phase being cordierite and the minor crystalline phase being mullite, and the amount of $Na_2O$ and $K_2O$ contained in the body being less than about 0.14% by weight, dry mixing the powder constituents for a period sufficient to obtain a uniform blending, adding a uniform solution of an organic binder material in water from which the salts have been removed and wet mixing the materials for an additional period to achieve uniform wetting, the amount of the water being such as to achieve a batch consistency which enables extrusion while enabling the extruded body to stand without sag in the green state, feeding the materials through an extruder to form the desired catalyst support green body, drying said body to remove substantially all the water therein, firing the dry body at a peak temperature of from about 2550° to 2570° F. for a period of from 3 to 4 hours and finishing the fired body to the desired size by removal of the end portions to eliminate any collapsed fluid passage portions.

8. A method in accordance with claim 7 wherein the amount of the materials in the powder mixture are based on achieving a fired composition, in % by weight, of about 35.2% $Al_2O_3$, 51.2% $SiO_2$, and 13.6% MgO.

9. A method in accordance with claim 7 wherein the amount of the materials in the powder mixture are based on achieving a fired composition, in % by weight, of about 42.2% $Al_2O_3$, 45.7% $SiO_2$, and 12.1% MgO.

10. A method in accordance with claim 7 wherein the amount of the materials in the powder mixture are based on achieving a fired composition, in % by weight, of about 46.7% $Al_2O_3$, 42.1% $SiO_2$, and 11.2% MgO.

* * * * *